A. McKINNON.
LUBRICATING MEANS FOR TROLLEY WHEELS.
APPLICATION FILED AUG. 11, 1919.
1,375,525.
Patented Apr. 19, 1921.
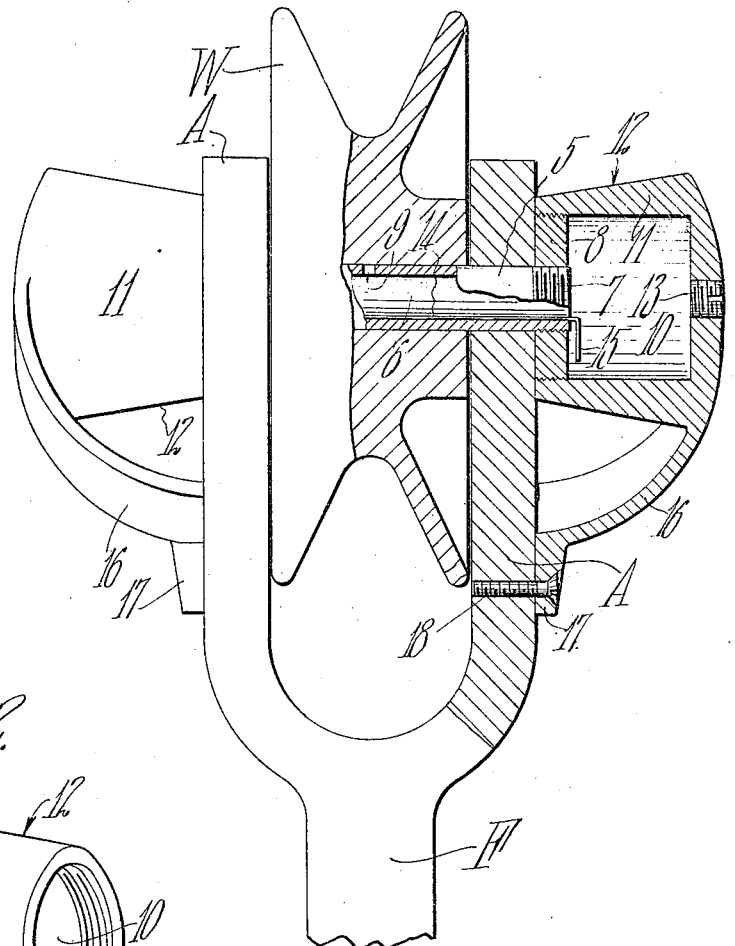
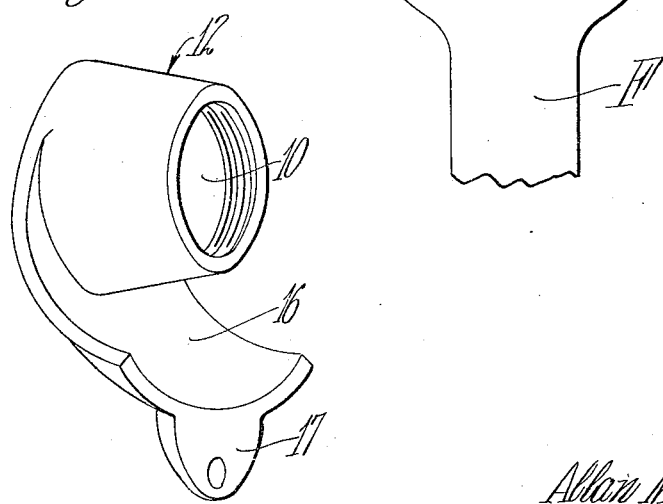
INVENTOR
Allan McKinnon.
BY Chapin & Neal
ATTORNEYS.

UNITED STATES PATENT OFFICE.

ALLAN McKINNON, OF HOLYOKE, MASSACHUSETTS.

LUBRICATING MEANS FOR TROLLEY-WHEELS.

1,375,525.  Specification of Letters Patent.  Patented Apr. 19, 1921.

Application filed August 11, 1919. Serial No. 316,572.

*To all whom it may concern:*

Be it known that I, ALLAN McKINNON, a citizen of the United States of America, residing at Holyoke, in the county of Hampden and State of Massachusetts, have invented certain new and useful Improvements in Lubricating Means for Trolley-Wheels, of which the following is a specification.

This invention relates to improved means for lubricating trolley wheels and the like.

According to this invention, the trolley wheel is provided with a special spindle having an axial passage therein, into which lubricant may be fed and means connecting such passage to the outer surface of the spindle, together with a lubrication reservoir fixed to the outer side of the fork-like support for the spindle and communicating with said axial passage.

According to another feature of the invention, two lubricant containing reservoirs are provided, one on each side of the fork-like support, and the spindle is made hollow to connect both reservoirs.

Other features and advantages will appear in the following description and in the illustrative embodiment of the invention in the accompanying drawings, in which—

Figure 1 is an elevational view, partly in section, of a trolley wheel and support, embodying the invention; and Fig. 2 is a perspective view of one of the lubrication reservoirs.

Referring to these drawings; W represents the trolley wheel, F the fork-like upper end of a trolley pole, the two spaced parallel portions of such end being designated A. The elements, thus far described, have been illustrated merely in conventional form inasmuch as they are well-known in the art. Such elements may be constructed as desired and the invention is independent of their particular details of construction.

The trolley wheel W rotates upon a spindle 5, which is of hollow, sleeve-like construction, having an axial passage 6 extending from end to end. The spindle 5 is of such length that its ends project beyond the portions A, in which it is mounted, and such ends are threaded, as at 7, to receive nuts 8, which engage the outer faces of the portions A and hold the spindle axially in position. The spindle 5 is provided with an axial passage 6 therethrough and suitable means are provided to connect the exterior bearing surface of the spindle to this passage, such as a radial opening 9, for example, which opening is preferably, although not necessarily, located as shown.

The lubrication reservoirs consist of chambers 10, of cylindrical shape, which are formed in members 11. The latter are preferably formed by casting and so have a tapering exterior surface, as 12, to facilitate their withdrawal from the molds. Each member 11 is interiorly threaded adjacent its open end and nut 8 is exteriorly threaded to receive the member which is thereby held in place and so held as to effectively close the open end of the lubricant containing chamber 10. The inner end face of each member 11 preferably abuts the outer face of the adjacent portion A, the better to seal the chamber against the escape of lubricant.

Suitable means are provided in each member 11 to permit the filling of the reservoirs 10. Such means may, for example, consist of a set screw 13 which may be readily removed to permit lubricant, such as oil, to be poured into chamber 10. The level of oil in the chambers need not be above the axis of spindle 5, as oil may be conveyed from the reservoirs to the outer surface of the spindle by splashing due to vibration from the trolley pole or by other means, as will appear. To aid in conveying oil from the reservoirs 10 into the hollow spindle 5, a wire 14 may be placed in the passage 6 of the latter and the ends of such wire are bent, as at 15, to extend downwardly into the reservoirs and below the level of oil therein. Oil then travels up and along the wire by capillary attraction in a known manner.

Preferably, each member 11 is provided with an integral web 16 which starts flush with the outer end face of the member and extends downwardly and inwardly into abutment with the adjacent portion A. At its lower end, each web 16 is provided with an apertured lug 17 to receive a screw, as 18, by means of which the web is held in the desired location and the member 11 is prevented from turning. The web 16 is preferably curved, as shown, both laterally and longitudinally to present a convex and outwardly bowed exterior. Such exterior surface is cam-like in that it tends to deflect the trolley wire, whenever such wire lodges below the members 11, and force it outwardly and above the members into proper position. Without the webs, the wire might well become hooked in under the members 11, which necessarily project a substantial distance from the portions A, and particularly where, as here, the members preferably have the tapering exterior surface 12.

The invention has been disclosed herein, in an embodiment at present preferred, for illustrative purposes, but the scope of the invention is defined by the appended claim rather than by the foregoing description.

What I claim is—

The combination with a trolley wheel and the two spaced supports between which it rotates, of a hollow spindle for the wheel and passing through and beyond said supports, a screw thread on each protruding end of the spindle, a hollow lubrication reservoir threaded onto each end of the spindle to abut the adjacent supports, whereby the spindle is held against end play and the reservoirs are held to the supports, additional means for removably securing the reservoirs to their supports, and a passage in the hollow spindle to connect its interior to its external periphery.

ALLAN McKINNON.